United States Patent [19]

Martin

[11] Patent Number: 5,174,692
[45] Date of Patent: Dec. 29, 1992

[54] DRILLING TOOL AND APPARATUS WITH IMPROVED SWARF REMOVAL

[75] Inventor: Guy E. Martin, Colomiers, France

[73] Assignee: Aerospatiale Societe Nationale Industrielle, Paris, France

[21] Appl. No.: 780,236

[22] Filed: Oct. 22, 1991

[30] Foreign Application Priority Data

Oct. 22, 1990 [FR] France .................. 90 13054

[51] Int. Cl.5 ............................................ B23B 51/06
[52] U.S. Cl. ........................................ 408/56; 408/59
[58] Field of Search ............... 408/56, 57, 59, 230; 409/135, 136

[56] References Cited

U.S. PATENT DOCUMENTS

| 2,237,901 | 4/1941 | Chun ................................. 408/59 |
| 2,912,887 | 11/1959 | Andreasson ......................... 408/57 |
| 3,359,837 | 12/1967 | Andreasson ......................... 408/230 |
| 3,460,410 | 8/1969 | Briles ................................. 408/57 |
| 3,591,302 | 7/1971 | Andreasson ......................... 408/59 |
| 4,320,999 | 3/1982 | Briese ................................. 408/59 |

FOREIGN PATENT DOCUMENTS

| 253908 | 5/1963 | Australia .......................... 408/59 |
| 1602761 | 8/1970 | Fed. Rep. of Germany . |
| 2649323 | 7/1977 | Fed. Rep. of Germany . |
| 78-26701 | 12/1978 | Fed. Rep. of Germany . |
| 2460172 | 2/1981 | France ............................. 408/59 |
| 936411 | 9/1963 | United Kingdom . |
| 1020516 | 2/1966 | United Kingdom . |
| 1435166 | 5/1976 | United Kingdom ............... 408/59 |

Primary Examiner—Daniel W. Howell
Attorney, Agent, or Firm—Fisher, Christen & Sabol

[57] ABSTRACT

A drilling tool, such as, a drill bit or a reamer, including at least two helical flutes about the axis of said tool. The tool is remarkable in that it includes an axial channel opening out at a fixed end of the tool designed to be received in rotary drive means therefor, and a plurality of ducts connecting the axial channel to the bottom of each flute. Each duct opens out into the corresponding flute via an orifice and is inclined towards the free end of the tool, opposite to the fixed end thereof.

3 Claims, 1 Drawing Sheet

DRILLING TOOL AND APPARATUS WITH IMPROVED SWARF REMOVAL

The present invention relates to a drilling tool such as a drill bit or a reamer, including at least two helical flutes about the axis of said tool.

The present invention is particularly, but not exclusively, adapted to countersunk head reamers for making the bores required for installing fasteners enabling an airplane wing to be joined to the fuselage thereof.

BACKGROUND OF THE INVENTION

It is known that for the purpose of swarf removal, existing drilling tools include flutes that are very pronounced. As a result, there is relatively little material in the section thereof, which means that such tools are not always as still as is desirable. In addition, in spite of such pronounced flutes, swarf removal nevertheless remains difficult, such that a tool that operates properly going downwards cannot give satisfaction when operated upwards. Thus, in the above application, a tool for making bores in a top surface cannot operate correctly when used for making bores in a bottom surface.

An object of the present invention is to remedy these drawbacks. The present invention relates to a drilling tool and a drilling apparatus of great stiffness and capable of removing swarf properly.

SUMMARY OF THE INVENTION

To this end, the present invention provides a drilling tool such a drill bit or a reamer, including at least two helical flutes about the axis of said tool, the tool being remarkable in that it includes an axial channel opening out at a fixed end of said tool designed to be received in rotary drive means therefore, and a plurality of ducts connecting said axial channel to the bottom of each flute, each duct opening out into the corresponding flute via an orifice and being inclined towards the free end of said tool, opposite to said fixed end thereof.

Thus, as shown below, it is possible to connect said tool either to a source of lubricant or to a source of compressed gas, thereby making it possible to obtain good lubrication of the tool and good removal of swarf simultaneously. Because said ducts slope towards the tip of the tool, they provide an optimum swarf clearance function. The tool of the invention can thus be used downwards or upwards.

It may also be observed that because of the inclination of said ducts, lubrication can be performed properly using only one hole per flute. As a result the consumption of lubricant is moderate.

Preferably, the axis of each duct is at an angle approximately equal to 45° relative to the axis of said tool and of said channel.

Also preferably, the orifices through which the ducts open out into the flutes are distributed along said tool. The lubricant is thus distributed as well as possible along the tool, thereby also leading to a saving of said lubricant.

Naturally, adjacent to said end for fixing the tool to said drive means, said tool includes means for connecting it to a circuit for feeding it with fluid under pressure, as described in greater detail below, said fluid may be a lubricant or a flow of gas for clearing swarf.

The present invention also provides drilling apparatus comprising a drilling tool such as a drill bit or a reamer provided with at least two helical flutes about the axis of said tool, together with rotary drive means for said tool, the apparatus being remarkable in that:

said tool includes an axial channel opening out at a fixed end of said tool designed to be received in said rotary drive means, and a plurality of ducts connecting said axial channel to the bottom of each flute, each duct opening out into the corresponding flute via an orifice and being inclined towards the free end of said tool, opposite its said fixed end;

it includes a circuit for feeding fluid under pressure; and said tool includes, adjacent to said fixed end, coupling means for coupling it to said circuit for feeding fluid under pressure.

According to an important feature of the present invention, the said circuit for feeding fluid under pressure comprises two paths terminating at a selector device enabling one or other of the fluids flowing in said paths to be applied to said tool. Thus, one of said feed circuit paths may convey a lubricant fluid under pressure for the tool, e.g. a flow comprising a mixture of air and oil, while the other one of said paths may convey a fluid for blowing away swarf, e.g. compressed air.

Preferably, the fluid for blowing away swarf is at a pressure higher than that of the lubricating fluid, a controllable stop valve is fitted on the path conveying said fluid for blowing away swarf, and said selector device directs to said tool that one of the two fluids that is exerting a higher pressure at its inlet to said selector device.

Thus, so long as said valve is open, it is the swarf-clearing fluid that is injected into the channel and said inclined ducts. In contrast, as soon as the stop valve is closed, the selector device allows the lubricating fluid to pass. It may be observed that such a device is particularly economical on lubricant while disposing of swarf effectively.

BRIEF DESCRIPTION OF THE DRAWINGS

An embodiment of the invention is described by way of example with reference to the accompanying drawings, in which.

DETAILED DESCRIPTION

Figure 1:
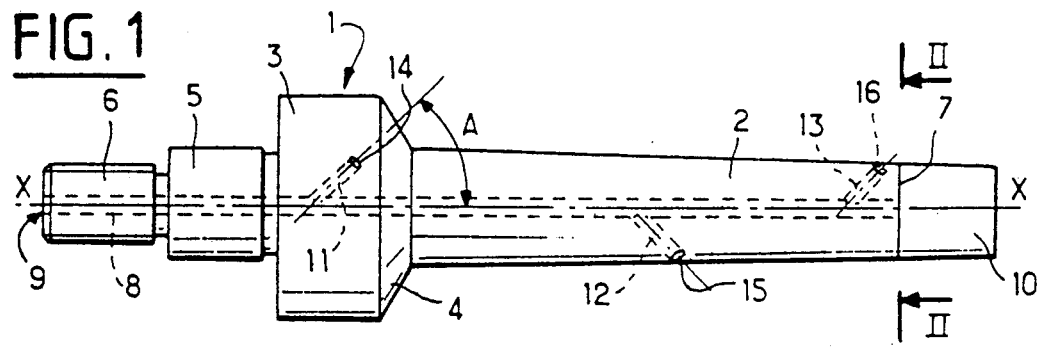
FIG. 1 shows a blank for a countersunk head reamer in accordance with the present invention.

The countersunk head reamer blank 1 shown in FIG. 1 comprises a conical rod 2 connected at its larger diameter end to a cylindrical portion 3 via a conical shoulder 4. At its end opposite from the rod 2, the cylindrical portion 3 is connected to a shank 5, itself in an intermediate position between the cylindrical portion 3 and a threaded shank 6.

The blank 1 is circularly symmetrical about a longitudinal axis x—x.

An axial channel 8 runs along the blank 1 from its end 6 to the small diameter end 7 of the rod 2. This axial channel 8 opens out to the outside of the blank 1 via an orifice 9 formed in the free end of the threaded shank 6. In contrast, at the small diameter end 7 of the conical rod 2, the blank includes an add-on portion 10 that closes said axial channel 8. In addition, ducts 11, 12, and 13 that are inclined towards the end 7 and the add-on part 10 connect the axial channel 8 to the conical outside wall of the rod 2. The ducts 11, 12, and 13 are such that their axes are at an angle A that is at least approximately equal to 45° relative to the axis X—X. They open out in the conical outside wall of the conical rod 2 via orifices given respective references 14, 15, and 16.

Figure 2:
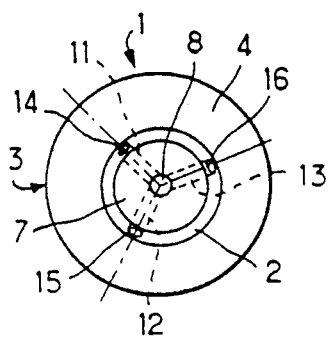
FIG. 2 is a view on line II—II of FIG. 1.

As shown in FIGS. 1 and 2, the ducts 11, 12, and 13 are distributed along the length of the conical rod 2, as well as around the axis X—X.

The blank 1 shown in FIGS. 1 and 2 is designed for use in making a tool 20 having three cutting edges 21, 22, and 23, and three flutes 24, 25, and 26. That is why the number of ducts 11 to 13 is equal to three.

Figure 3:
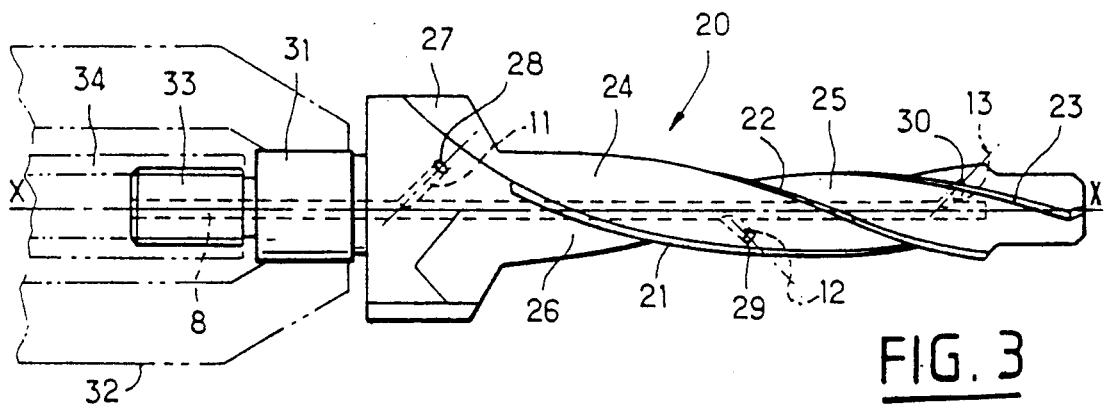
FIG. 3 shows the countersunk reamer in accordance with the present invention obtained from the blank of FIG. 1.

The reamer 20 shown in FIG. 3 is made in conventional manner from the blank 1 so as to form a countersunk head 27 in the cylindrical portion 3 and the conical shoulder 4 in addition to the cutting edges 21 and 23 and the flutes 24 to 26. FIG. 3 shown that after the tool 20 has been made, the ducts 11, 12, and 13 open out respectively into the flutes 24, 26, and 25 via orifices 28 to 30 that occur where said ducts are intersected by the surfaces of said flutes.

As can be seen, the shank 5 is used as rotary drive head 31 for the reamer 20, said head 31 being clamped in a chuck 32 which is in turn constrained to rotate with drive means (not shown).

Finally, the threaded shank 6 is used as a coupling 33 for connection to a pipe 34 conveying fluid under pressure.

Figure 4:
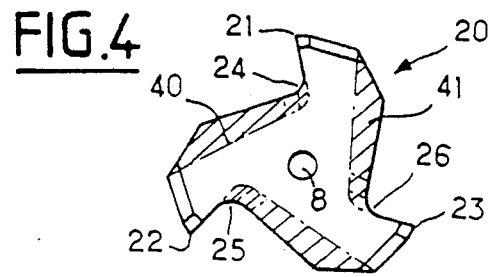
FIG. 4 is on a larger scale and shows a section of the FIG. 3 reamer.

As can be seen in the section of FIG. 4, the section of the tool 20 is solid, conferring a high degree of stiffness on the tool.

As explained below, the ducts 11, 12, and 13 serve to feed the reamer both with lubricating fluid and with swarf removing fluid, such that the operation of the reamer is optimized and there is no need to provide flutes that are particularly deep for facilitating swarf removal. By way of example, dot-dashed lines in FIG. 4 represent the usual outline 40 for known reamers having three cutting edges. As shown, compared with such known tools, the section of the reamer in accordance with the present invention includes additional peripheral zones 41.

Figure 5:
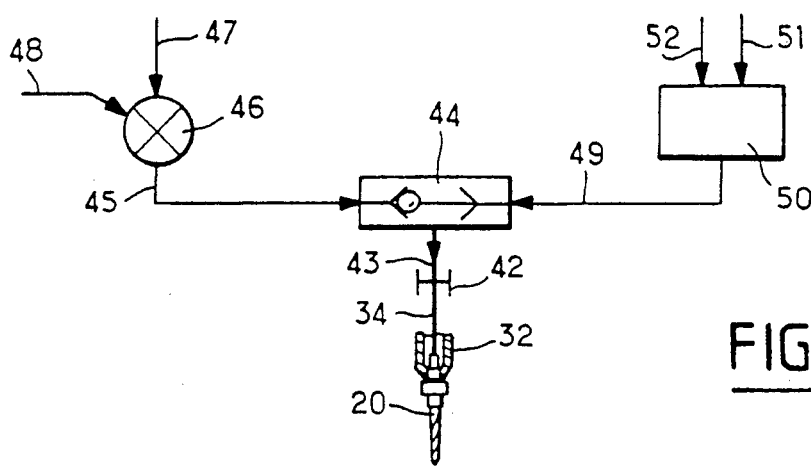
FIG. 5 is a circuit diagram summarizing one embodiment of drilling apparatus of the invention.

As shown in FIG. 5, the pipe 34 connected to the axial channel 8 via the coupling is itself connected via a rotary joint system 42 to the outlet 43 of a circuit selector device 44.

One of the inlets 45 of the selector device 44 is connected to a stop valve 46 which is disposed on a pipe 47 conveying a flow of air under pressure, e.g. at 6 bars. The stop valve 46 is under the control of a member 48.

The other input 49 of the selector device 44 receives a mixture of lubricating oil and air under pressure from a mixer 50 which receives these fluids via respective pipes 51 and 52. The flow of lubricating fluid reaching the input 49 of the selector device 44 may be at a pressure at 2 bars, for example.

The selector device 44 is sensitive to pressure and it connects its output 43 to that one of the two gaseous flows applied to its inputs 45 and 49 that has the higher pressure.

Thus, when the valve 46 is open, the flow of air from the pipe 47 is injected into the channel 8 and leaves the tool 20 via the orifices 28 to 30. In this case the input 49 is closed. In contrast, when the valve 46 is closed by action of the control member 48, it is the flow of lubricating fluid applied to the inlet 49 which is fed to the reamer 20.

It can thus be seen, that the control member 48 of the valve 46 makes it possible to feed the tool 20 while it is in operation alternately with a flow of lubricating fluid and with a flow of gas under high pressure suitable for blowing away swarf. The operating conditions of the tool 20 can be optimized as a function of the work it is performing by adapting the on and off times of the valve 46.

I claim:

1. Drilling apparatus comprising a drilling tool such as a drill bit or a reamer provided with at least two helical flutes about the axis of said tool, together with rotary drive means for said tool, wherein:

said tool includes an axial channel opening out at a fixed end of said tool designed to be received in said rotary drive means, and a plurality of ducts connecting said axial channel to the bottom of each flute, each duct opening out into the corresponding flute via an orifice and being inclined towards the free of said tool, opposite its said fixed end;

said drilling apparatus includes a circuit for feeding fluid under pressure;

said tool includes, adjacent to said fixed end, coupling means for coupling it to said circuit for feeding fluid under pressure;

said circuit for feeding fluid under pressure comprising two paths terminating at a selector device enabling one or other of the fluids flowing along said paths to be applied to said tool and one of said paths conveying a flow of lubricating fluid for the tool while the other one of said paths conveys a fluid for blowing away swarf; and said fluid for blowing away swarf being at a pressure higher than that of the lubricating fluid, a controllable stop valve being fitted on the path conveying said fluid for blowing away swarf, and said selector device directing to said tool that one of the two fluids that is exerting a higher pressure at its inlet to said selector device.

2. Drilling apparatus according to claim 1 wherein the axis of each duct is at an angle approximately equal to 45 degrees relative to the axis of said tool and of said channel 3. Drilling apparatus according to claim 1 wherein said orifices are axially spaced along said tool.

* * * * *